United States Patent
Hsieh

(10) Patent No.: US 8,428,901 B2
(45) Date of Patent: Apr. 23, 2013

(54) MOBILE COMMUNICATION DEVICE AND METHOD FOR USING THE SAME

(75) Inventor: Hsing-Yuan Hsieh, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 395 days.

(21) Appl. No.: 12/852,576

(22) Filed: Aug. 9, 2010

(65) Prior Publication Data

US 2011/0137607 A1 Jun. 9, 2011

(30) Foreign Application Priority Data

Dec. 7, 2009 (CN) .......................... 2009 1 0311018

(51) Int. Cl.
*G06F 15/00* (2006.01)
(52) U.S. Cl.
USPC ........... 702/130; 702/141; 702/150; 473/405; 473/415; 455/41.1; 455/404.2; 340/540; 340/541
(58) Field of Classification Search .................. 702/130, 702/150, 141; 340/540, 541; 473/405, 415; 455/404.2, 41.1
See application file for complete search history.

(56) References Cited

U.S. PATENT DOCUMENTS

| | | | | |
|---|---|---|---|---|
| 7,024,310 B2* | 4/2006 | Root et al. | ......................... | 702/3 |
| 2006/0148594 A1* | 7/2006 | Saintoyant et al. | ........... | 473/405 |
| 2007/0082652 A1* | 4/2007 | Hartigan et al. | ........... | 455/404.2 |
| 2008/0201094 A1* | 8/2008 | Vogt et al. | ........................ | 702/82 |
| 2009/0167185 A1* | 7/2009 | Cheng | .............................. | 315/56 |
| 2009/0243852 A1* | 10/2009 | Haupt et al. | ................... | 340/541 |
| 2010/0253509 A1* | 10/2010 | Fu et al. | .................... | 340/539.22 |
| 2010/0269526 A1* | 10/2010 | Pendergrass et al. | ........... | 62/186 |
| 2010/0299615 A1* | 11/2010 | Miluzzo et al. | ................ | 715/752 |
| 2011/0191058 A1* | 8/2011 | Nielsen et al. | ................. | 702/130 |

FOREIGN PATENT DOCUMENTS

JP 59084648 A * 5/1984

* cited by examiner

*Primary Examiner* — Carol Tsai
(74) *Attorney, Agent, or Firm* — Altis Law Group, Inc.

(57) ABSTRACT

A mobile communication device includes a communication unit for communicating with other communication devices, a processor unit connected to the communication unit, and a sensor unit connected to the processor unit. The sensor unit includes at least one of a humidity sensor and a temperature sensor. The humidity sensor senses ambient moisture and generates an electronic signal corresponding to the ambient moisture, and the temperature sensor measures ambient temperature and generates an electric signal corresponding to the ambient temperature. The processor unit calculates at least one of the ambient humidity and ambient temperature according to the electric signals and transmits associated data of the sensor unit to the communication unit. The communication unit sends the data to other communication devices capable of communicating with the mobile communication device.

9 Claims, 3 Drawing Sheets

MOBILE COMMUNICATION DEVICE AND METHOD FOR USING THE SAME

BACKGROUND

1. Technical Field

The present disclosure relates to mobile communication devices and particularly to a multifunctional mobile communication device and methods for using the same

2. Description of Related Art

Mobile communication devices, such as mobile phones, personal digital assistants (PDA), and laptop computers, are widely used. However, most mobile communication devices, only allow two or more users, communicating with each other, to transmit voice signals or text messages. A user cannot use a mobile communication device to learn more information about the other user, such as ambient temperature and humidity of the user.

Therefore, there is room for improvement within the art.

BRIEF DESCRIPTION OF THE DRAWINGS

Many aspects of the present mobile communication device and method for using the same can be better understood with reference to the following drawings. The components in the various drawings are not necessarily drawn to scale, the emphasis instead being placed upon clearly illustrating the principles of the present mobile communication device and method for using the same. Moreover, in the drawings, like reference numerals designate corresponding parts throughout the figures.

DETAILED DESCRIPTION

Figure 1:
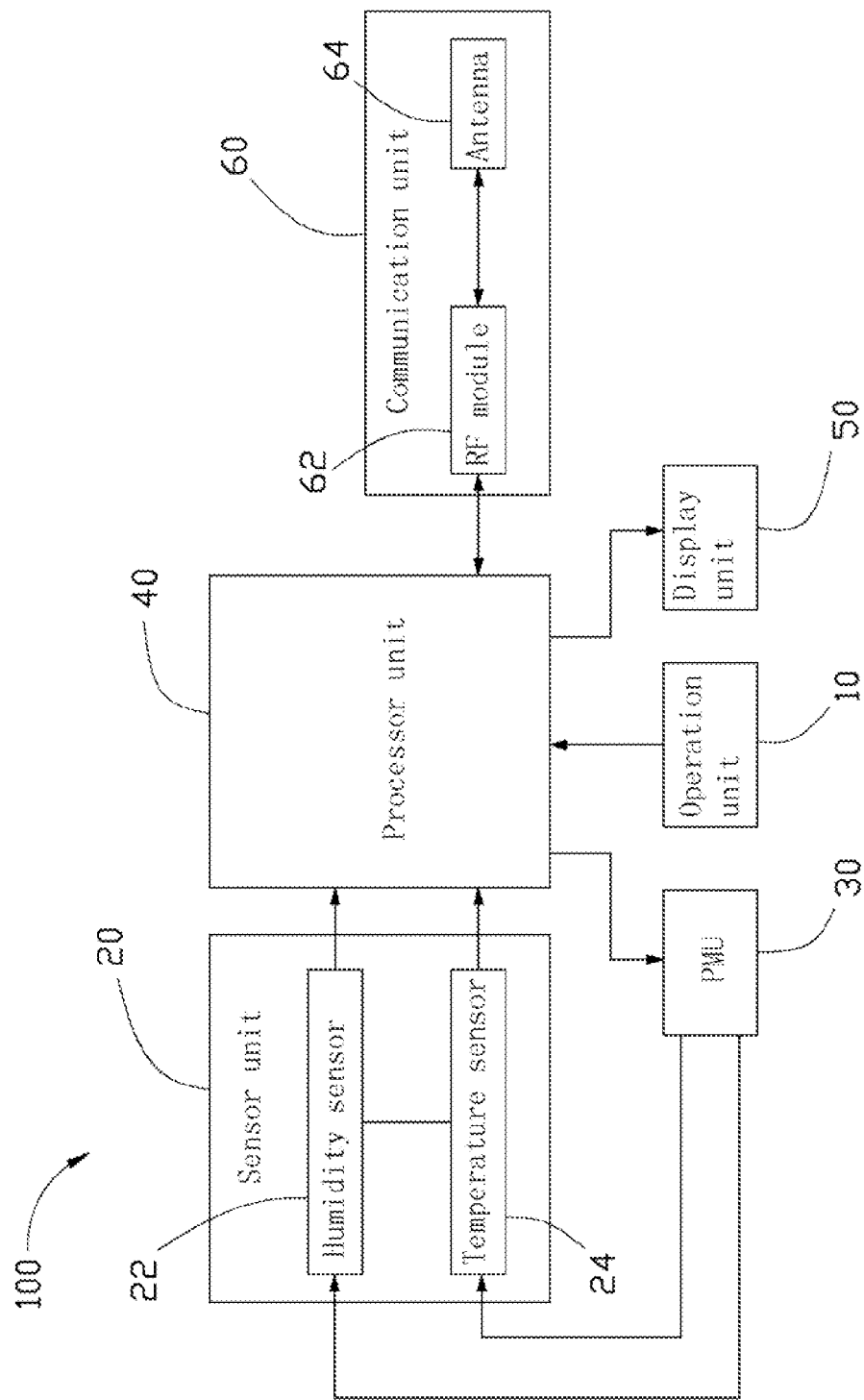
FIG. 1 is a block diagram of a mobile communication device, according to an exemplary embodiment.

FIG. 1 shows a mobile communication device 100 according to an exemplary embodiment. The mobile communication device 100 can be a mobile phone, a personal digital assistant (PDA), or a laptop computer. The electronic device 100 includes an operation unit 10, a sensor unit 20, a power management unit (PMU) 30, a processor unit 40, a display unit 50, and a communication unit 60. The operation unit 10, the sensor unit 20, the PMU 30, the display unit 50, and the communication unit 60 are all electrically connected to the processor unit 40. The PMU 30 is also electrically connected to the sensor unit 20.

The operation unit 10 can be a conventional keypad or touch pad. Instructions can be input to the processor unit 40 by operating the operation unit 10. The sensor unit 20 includes at least one of a humidity sensor 22 and a temperature sensor 24, and preferably both types of sensors. The humidity sensor 22 and the temperature sensor 24 are both mounted on an outside surface (not shown) of the mobile communication device 100, and are both electrically connected to the PMU 30 and the processor unit 40. The PMU 30 can provide electric power to the sensor unit 20 to actuate the sensor unit 20. When the sensor unit 20 is actuated, the humidity sensor 22 can sense ambient moisture and generate an electronic signal corresponding to a concentration of the ambient moisture, and the temperature sensor 24 can measure ambient temperature and generate an electric signal corresponding to the ambient temperature.

The processor unit 40 can be a conventional central processing unit (CPU) of the mobile communication device 100. The display unit 50 can be a conventional display module of the mobile communication device 100, such as a light crystal display (LCD). The processor unit 40 can receive the electric signals generated by the humidity sensor 22 and the temperature sensor 24 and calculate ambient humidity and ambient temperature according to the electric signals. Furthermore, the processor unit 40 can also control the PMU 30 to provide electric power to the sensor unit 20 and control the display unit 50 to display images. The communication module 60 includes a radio frequency (RF) module 62 electrically connected to the processor unit 40 and an antenna 64 electrically connected to the RF module 62. When the mobile communication device 100 is used to send wireless signals to other communication devices, the RF module 62 converts digital signals sent from the processor unit 40 to radio signals and transmits the radio signals to the antenna 60, and the antenna 60 sends the radio signals to other communication devices. When the mobile communication device 100 receives radio signals from other communication devices using the antenna 60, the antenna 60 transmits the radio signals to the RF module 62 and the RF module 62 converts the radio signals to digital signals and transmits the digital signal to the processor unit 40.

Figure 2:
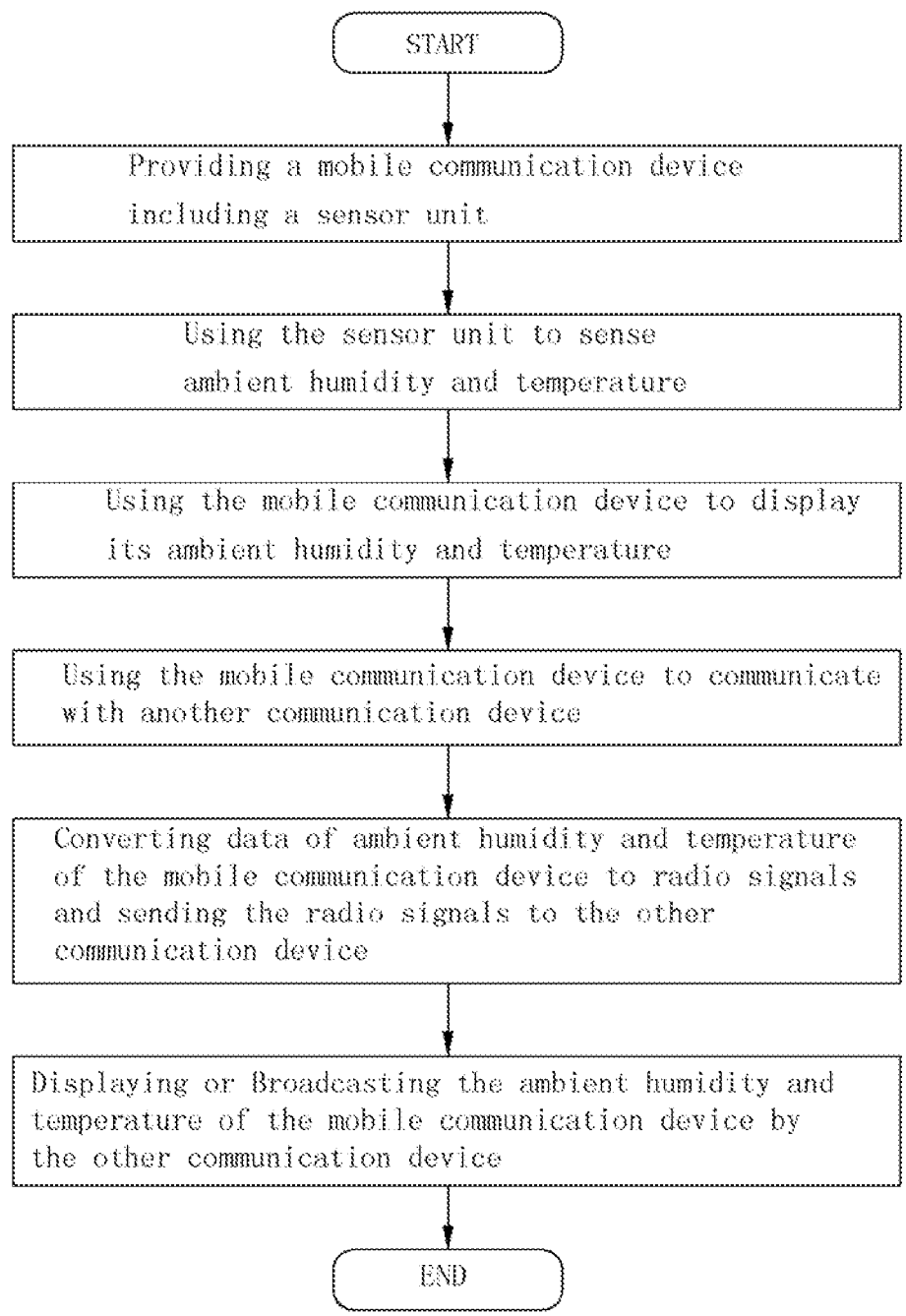
FIG. 2 is a flowchart of a method for using the mobile communication device shown in FIG. 1, according to a first exemplary embodiment.

Also referring to FIG. 2, a method for using the mobile communication device 100, according to a first exemplary embodiment, is provided. The method includes these following steps.

In the method, a mobile communication device 100 is provided. Instruction for actuating the sensor unit 20 is input to the processor unit 40 via the operation module 10. When receiving the instruction, the processor unit 40 controls the PMU 30 to provide electric power to the sensor unit 20. Thus, the humidity sensor 22 senses ambient moisture and generates an electronic signal corresponding to a concentration of the ambient moisture, and the temperature sensor 24 measures ambient temperature and generates an electric signal corresponding to the ambient temperature.

The processor unit 40 receives the electric signals generated by the humidity sensor 22 and the temperature sensor 24 and calculates ambient humidity and ambient temperature according to the electric signals. The processor unit 40 can control the display unit 50 to display data of ambient humidity and ambient temperature as images or character messages. Thus, the user of the mobile communication device 100 knows ambient humidity and ambient temperature.

When the mobile communication device 100 communicates with other conventional communication devices (not shown), the processor unit 40 transmits data of the ambient humidity and ambient temperature to the communication unit 60. The RF module 62 converts the data to radio signals and transmits the radio signals to the antenna 60, and the antenna 60 sends the radio signals to the conventional communication devices. A conventional communication device converts the radio signals to data of ambient humidity and ambient temperature of the mobile communication device 100, and then displays the ambient humidity and ambient temperature of the mobile communication device 100 as images or character messages, or plays audio signals to broadcast the ambient humidity and ambient temperature of the mobile communication device 100. The methods for converting the radio signals, displaying images/messages and playing audio signals can be all conventional, and thus no unnecessary detail relating thereto is provided here. In this way, the users of the communication devices communicating with the mobile communication device 100 can also know ambient humidity and ambient temperature of the user of the mobile communication device 100.

Figure 3:
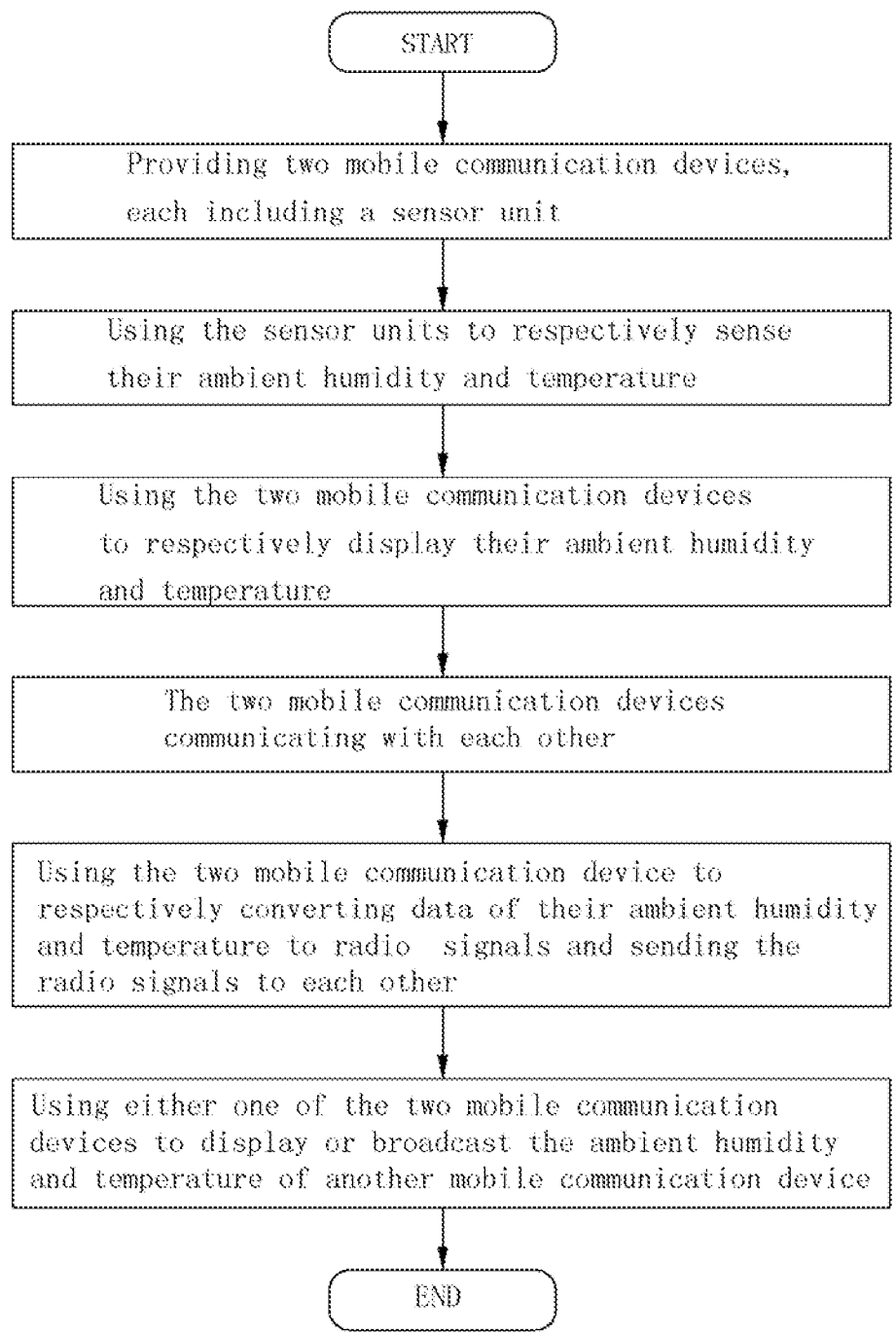
FIG. 3 is a flowchart of a method for using the mobile communication device shown in FIG. 1, according to a second exemplary embodiment.

Also referring to FIG. 3, another method for using the mobile communication device 100, according to a second exemplary embodiment, is provided. The method includes these following steps.

In the method, two mobile communication devices 100 are provided. In each mobile communication device 100, instructions for actuating its sensor unit 20 are input to its processor unit 40 with its operation module 10. When receiving the instruction, the processor unit 40 controls its PMU 30 to provide electric power to its sensor unit 20. Thus, the humidity sensor 22 of each mobile communication device 100 senses its ambient moisture and generates an electronic signal corresponding to a concentration of the ambient moisture, and the temperature sensor 24 of each mobile communication device 100 measures its ambient temperature and generates an electric signal corresponding to the ambient temperature.

The processor unit 40 of each mobile communication device 100 receives the electric signals generated by the humidity sensor 22 and the temperature sensor 24 of the mobile communication device 100, and calculates ambient humidity and ambient temperature according to the electric signals. The processor unit 40 can control the display unit 50 of the mobile communication device 100 to display data of ambient humidity and ambient temperature. Thus, the user of each mobile communication device 100 knows his/her ambient humidity and ambient temperature.

When the two mobile communication devices 100 communicate with each other, their processor units 40 respectively transmit data of their ambient humidity and ambient temperature to their communication units 60. Their RF modules 62 respectively convert the data to radio signals and transmit the radio signals to their antennas 60, and the two mobile communication devices 100 send the radio signals corresponding to their ambient humidity and ambient temperature to each other with their antennas 60. Thus, the RF modules 62 of the two mobile communication devices 100 respectively convert the radio signals to data of ambient humidity and ambient temperature of each other. Either one of the two mobile communication devices 100 can display the ambient humidity and ambient temperature of another mobile communication device 100 as images or character messages by the display unit 50, or play audio signals to broadcast the ambient humidity and ambient temperature of the other mobile communication device 100 by conventional audio devices, such as a speaker. In this way, the users of the two mobile communication devices 100 can know ambient humidity and ambient temperature of each other.

The present mobile communication device 100 can sense and display its ambient humidity and ambient temperature, and can provide the ambient humidity and ambient temperature to other communication devices. Upon receiving the ambient humidity and ambient temperature of the mobile communication device 100, the users of other communication devices in communication with the mobile communication device 100 will pay more attention to the user of the mobile communication device 100. Furthermore, the sensor unit 20 can include other sensors, such as an air quality sensor, which are used similarly to the humidity sensor 22 and the temperature sensor 24.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A mobile communication device, comprising:
   a communication unit for communicating with other communication devices;
   a processor unit connected to the communication unit; and
   a sensor unit connected to the processor unit, the sensor unit including at least one of a humidity sensor and a temperature sensor;
   wherein the humidity sensor senses ambient moisture and generates an electronic signal corresponding to the ambient moisture, and the temperature sensor measures ambient temperature and generates an electric signal corresponding to the ambient temperature; the processor unit calculating at least one of the ambient humidity and ambient temperature according to the electric signals and transmitting associated data of the sensor unit to the communication unit, the communication unit sending the data to other communication devices capable of communicating with the mobile communication device;
   wherein the communication unit includes a radio frequency (RF) module connected to the processor unit and an antenna connected to the RF module; when the mobile communication device sends signals, the RF module converts digital signals sent from the processor unit to radio signals, and the antenna sends the radio signals; when the mobile communication device receives radio signals using the antenna, the RF module converts the radio signals to digital signals.

2. The mobile communication device as claimed in claim 1, further comprising a display unit connected to the processor unit, the processor unit controlling the display unit to display data of ambient humidity and ambient temperature.

3. The mobile communication device as claimed in claim 1, further comprising a power management unit (PMU) connected to the processor unit and the sensor unit, the processor unit controlling the PMU to provide electric power to the sensor unit.

4. A method for using mobile communication devices, comprising:
   providing a mobile communication device that includes a sensor unit for sensing at least one of ambient humidity and ambient temperature;
   using the sensor unit to sense at least one of the ambient humidity and ambient temperature; and
   when the mobile communication device communicates with another communication device, converting data of ambient humidity and ambient temperature of the mobile communication device to radio signals and sending the radio signals to the other communication device.

5. The method as claimed in claim 4, further comprising using the mobile communication device to display its ambient humidity and ambient temperature.

6. The method as claimed in claim 4, further comprising using the other communication device to convert received radio signals to data of ambient humidity and ambient temperature of the mobile communication device, and display the ambient humidity and ambient temperature of the mobile communication device or broadcast the ambient humidity and ambient temperature of the mobile communication device as audio signals.

7. A method for using mobile communication devices, comprising:

providing two mobile communication devices, each mobile communication device including a sensor unit for sensing at least one of ambient humidity and ambient temperature;

using the sensor units of the two mobile communication devices to respectively sense at least one of ambient humidity and ambient temperature of the two mobile communication devices; and when the two mobile communication device communicating with each other, using the two mobile communication device to respectively convert data of at least one of their ambient humidity and ambient temperature to radio signals and send the radio signals to each other.

8. The method as claimed in claim 7, further comprising using the two mobile communication devices to respectively display data of their ambient humidity and ambient temperature.

9. The method as claimed in claim 7, further comprising using either one of the two mobile communication devices to display ambient humidity and ambient temperature of another mobile communication device, or broadcast ambient humidity and ambient temperature of the other mobile communication device as audio signals.

* * * * *